United States Patent [19]
Stinnett

[11] Patent Number: 5,931,431
[45] Date of Patent: *Aug. 3, 1999

[54] CONTAINER-HOLDING DEVICE HAVING AN ADJUSTABLE CIRCUMFERENTIAL PORTION

[76] Inventor: Thomas M. Stinnett, 4923 Heathmoore Ct., Louisville, Ky. 40241-1875

[ * ] Notice: This patent issued on a continued prosecution application filed under 37 CFR 1.53(d), and is subject to the twenty year patent term provisions of 35 U.S.C. 154(a)(2).

[21] Appl. No.: 08/835,836

[22] Filed: Apr. 23, 1997

[51] Int. Cl.[6] .......................................................... A47K 1/09
[52] U.S. Cl. ............................. 248/313; 224/552; 224/926
[58] Field of Search .................................. 248/313, 311.2, 248/316.4, 314, 316.1, 346.11, 309.1, 310, 316.2, 523; 224/926, 552; 296/37.8, 37.12, 37.13, 37.14, 37.15, 37.16; 297/188.14

[56] References Cited

U.S. PATENT DOCUMENTS

| | | |
|---|---|---|
| D. 377,740 | 2/1997 | Swanson . |
| 1,252,108 | 1/1918 | Hartman ................................ 248/310 X |
| 2,686,032 | 8/1954 | Thorson ................................ 248/313 X |
| 3,891,171 | 6/1975 | Samuelian et al. ....................... 248/131 |
| 4,015,940 | 4/1977 | Conlon . |
| 4,395,013 | 7/1983 | Wissinger ........................ 248/311.2 X |
| 4,596,370 | 6/1986 | Adkins . |
| 4,655,425 | 4/1987 | Wallace et al. . |
| 4,681,219 | 7/1987 | Kitchens . |
| 4,721,216 | 1/1988 | Kinder . |
| 4,801,060 | 1/1989 | Thompson . |
| 5,054,733 | 10/1991 | Shields ................................. 248/310 X |
| 5,092,553 | 3/1992 | Joosse et al. ............................ 248/313 |
| 5,143,338 | 9/1992 | Eberlin .................................... 248/313 |
| 5,219,140 | 6/1993 | Spykerman .......................... 248/311.2 |
| 5,249,772 | 10/1993 | Montie, Jr. et al. ..................... 248/523 |
| 5,297,767 | 3/1994 | Miller et al. . |
| 5,337,984 | 8/1994 | Houck . |
| 5,385,325 | 1/1995 | Rigsby ................................ 224/552 X |
| 5,390,887 | 2/1995 | Campbell ............................. 248/311.2 |
| 5,398,898 | 3/1995 | Bever ............................... 248/311.2 X |
| 5,445,350 | 8/1995 | Rigsby . |
| 5,474,272 | 12/1995 | Thompson et al. . |
| 5,505,417 | 4/1996 | Plocher . |
| 5,560,578 | 10/1996 | Schenken et al. . |
| 5,573,214 | 11/1996 | Jones et al. . |
| 5,758,856 | 6/1998 | Carnahan et al. ....................... 248/523 |

*Primary Examiner*—Ramon O. Ramirez
*Assistant Examiner*—Stephen S. Wentsler
*Attorney, Agent, or Firm*—Middleton & Reutlinger

[57] ABSTRACT

A drink container-holding device including a support, an adjustable drink-holder assembly and an adjuster assembly. The support having a cup opening provided through a top wall thereof for receiving a cup and an adjuster opening provided through a first side wall thereof for receiving the adjuster assembly. The adjustable drink-holder assembly depending from a lower surface of the top wall near the cup opening. The adjuster assembly attaching to an exterior surface of the first side wall near the adjuster opening, extending through the adjuster opening and retaining the drink-holder assembly by means of an adjuster band. The drink-holder assembly including an adjustable diameter sleeve portion having a diameter adjustable by constriction and dilation of the adjuster band.

13 Claims, 4 Drawing Sheets

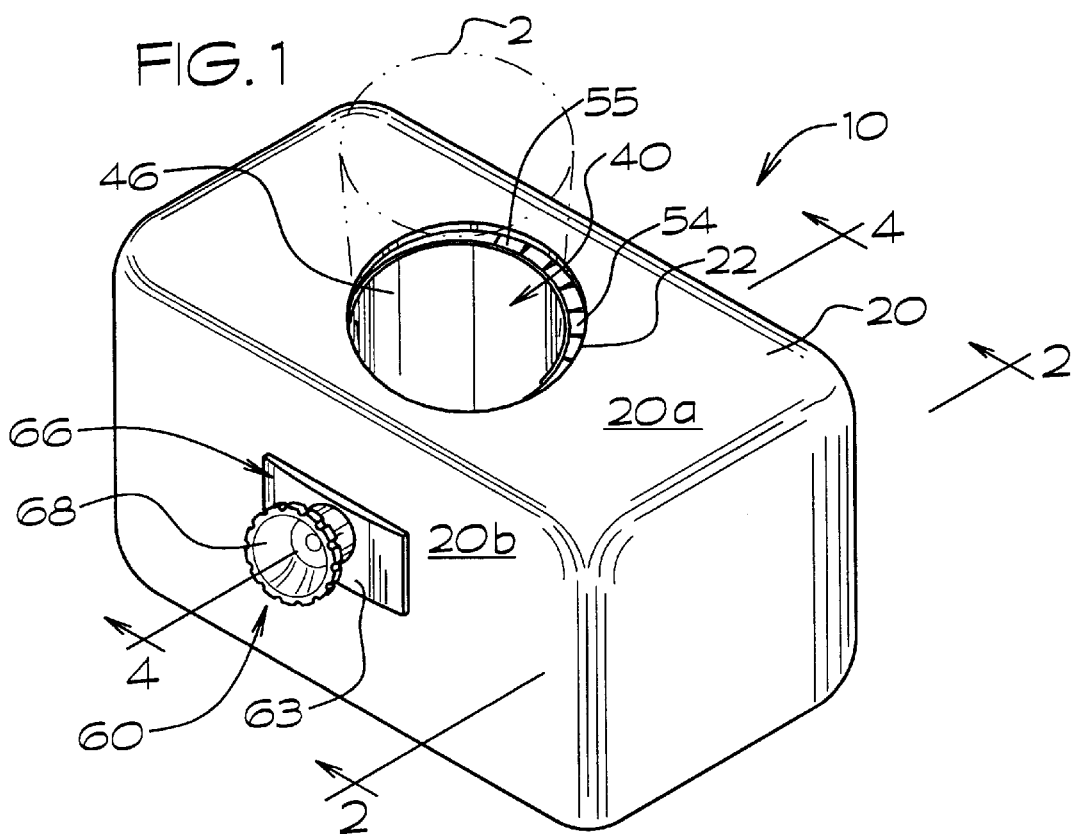
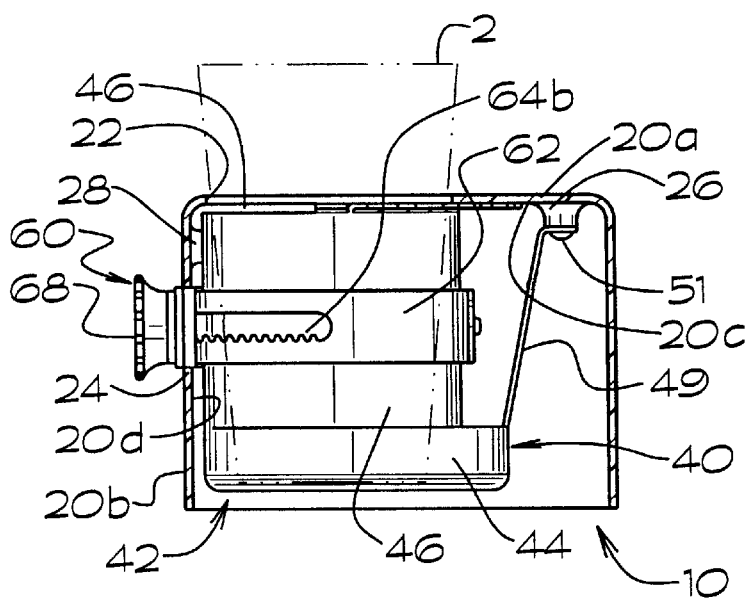

CONTAINER-HOLDING DEVICE HAVING AN ADJUSTABLE CIRCUMFERENTIAL PORTION

BACKGROUND OF THE INVENTION

1. Technical Field of the Invention

The present invention relates to devices for receiving and holding drink containers. More particularly, the present invention relates to adjustable devices which are adapted to receive and hold drink containers having a variety of sizes.

2. Discussion of the Prior Art

The use of a device to receive and hold a drink container is desirable in a variety of situations. Particularly, it is desirable for such a device to be provided in an automobile, boat or other closely conforming to the exterior surface of a container having a small diameter, resulting in a loose hold of such containers.

For example, U.S. Pat. No. 5,445,350 to Rigsby teaches one variation of an adjustable container holder having two opposed adjustable clamp members with opposed arcuate inner surfaces. However, the fixed arcuate surface of the clamp members of an adjustable container holder according to this reference is incapable of closely conforming to the arcuate surface of a drink container having either a very large or a very small diameter. As such, it is desirable to provide a container-holding device which is adjustably capable of receiving and holding containers having a variety of sizes and diameters.

SUMMARY OF THE INVENTION

Accordingly, it is an object of the present invention to provide a device for receiving and holding a drink container which avoids the disadvantages of the prior art.

More particularly, it is an object of the present invention to provide a device for receiving and holding a drink container for use in an automobile, boat or other recreational vehicle.

It is yet another object of the present invention to provide a device for receiving and holding a drink container wherein the device is capable of receiving and holding drink containers having a variety of sizes and diameters.

A drink container-holding device according to the present invention includes a support, an adjustable drink-holder assembly and an adjuster assembly. The support includes a cup opening provided through a top wall thereof for receiving a cup and an adjuster opening provided through a first side wall thereof for receiving the adjuster assembly. The adjustable drink-holder assembly depends from a lower surface of the top wall near the cup opening. The adjuster assembly attaches to an exterior surface of the first side wall near the adjuster opening, extends through the adjuster opening and retains the drink-holder assembly by means of an adjuster band. The drink-holder assembly includes an adjustable diameter sleeve portion having a diameter adjustable by constriction of the adjuster band.

BRIEF DESCRIPTION OF THE DRAWINGS

A better understanding of the present invention will be had upon reference to the following description in conjunction with the accompanying drawings in which like numerals refer to like parts, and wherein:

FIG. 1 is a perspective view of a preferred container-holding device of the present invention;

FIG. 2 is a side section view of the container-holding device of FIG. 1, taken along section line 2—2 of FIG. 1;

DETAILED DESCRIPTION OF THE PREFERRED EMBODIMENT

Figure 3:
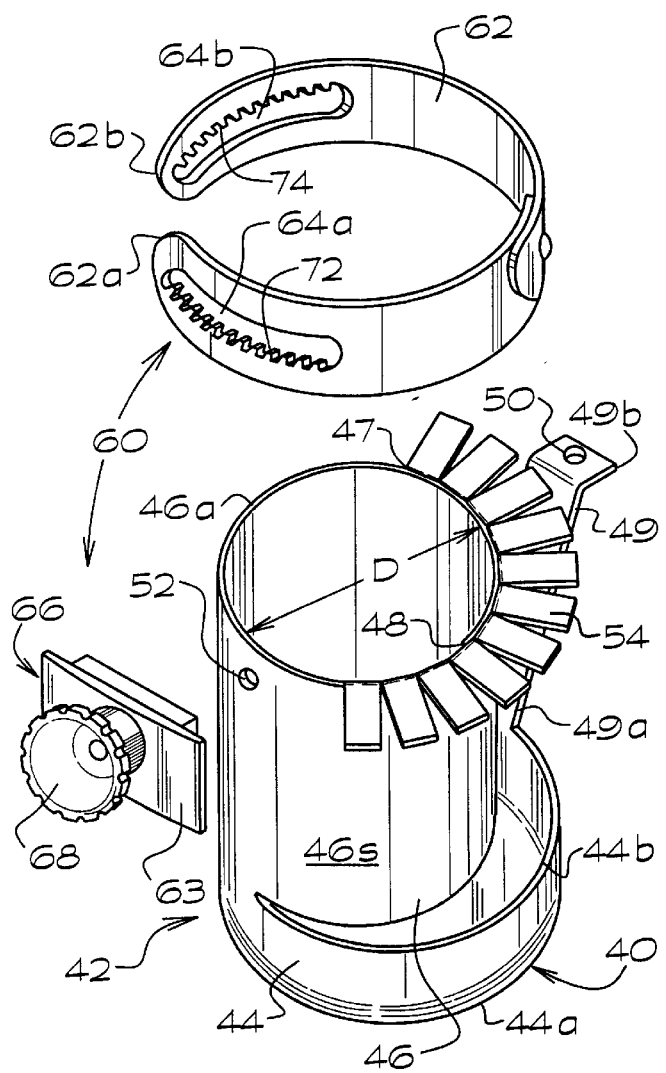
FIG. 3 is an exploded view of a preferred drink-holder assembly according to the present invention.

With reference to FIG. 1, a container-holding device 10 according to a preferred embodiment of the present invention is shown including a support 20, a drink-holder assembly 40 and an adjuster assembly 60. The support 20 includes a top wall 20a and a plurality of side walls including a first side wall 20b depending therefrom. The top wall 20a is provided with a cup opening 22 for receiving a cup 2. The first side wall 20b is provided with an adjuster opening 24 (FIG. 4) for receiving the adjuster assembly 60. The support 20 and the drink-holder assembly 40 may be made from any suitable light-weight, durable and low-cost material, such as, for example, molded polypropylene, and may be molded in any number of a variety of shapes to conform to the precise shape of its surroundings, such as, for example, the seat or floor of an automobile. The adjuster assembly is preferably made from any suitable wear-resistant, hardened plastic.

With reference to FIG. 2, the drink-holder assembly 40 is shown suspended within the support 20 and depending downwardly from the top wall 20a. A base support attachment 26 is affixed to a lower surface 20c of the top wall 20a near the cup opening 22 by any suitable means, such as, for example, by an adhesive or by integrally molding the base support attachment 26 with the top wall 20a. Similarly, a side support attachment 28 is affixed to an inner surface 20d of the first side wall 20b near the adjuster opening 24 (FIG. 4) by any suitable means, such as, for example, by an adhesive or by integrally molding the side support attachment 28 with the first side wall 20b. The base support attachment 26 and the side support attachment 28 are made from any sufficiently resilient material to permit their receiving and holding a first screw 51 and a second screw 53 (FIG. 4), respectively, embedded therein.

With additional reference to FIG. 3, the drink-holder assembly 40 is shown in greater detail. The drink-holder assembly 40 includes a generally cylindrical sleeve assembly 42 and a base support member 49. The generally cylindrical sleeve assembly 42 includes an adjustable diameter sleeve portion 46 having an open upper end 46a disposed near the cup opening 22 (FIG. 4) and a fixed diameter cup base portion 44 having a closed lower end 44a disposed opposite the open upper end 46a. The adjustable diameter sleeve portion 46 further includes a first longitudinal end 47, a second longitudinal end 48, and a plurality of flaps 54 projecting outwardly from the open upper end 46a.

The base support member 49 is attached at the lower distal end 49a thereof to an open upper end 44b of the cup base portion 44. An upper distal end 49b of the base support member 49 is disposed near the base support attachment 26 and includes a support member bore 50. The support member bore 50 is aligned with the base support attachment 26 and the first screw 51 is passed upwardly through the support member bore 50 and threaded into the base support attachment 26. The generally cylindrical sleeve assembly 42 is provided with a sleeve assembly bore 52 near the open upper end 46a opposite the base support member 49. The sleeve assembly bore 52 is aligned with the side support attachment 28 and the second screw 53 (FIG. 4) is passed outwardly through the sleeve assembly bore 52 and threaded into the side support attachment 28.

Figure 4:
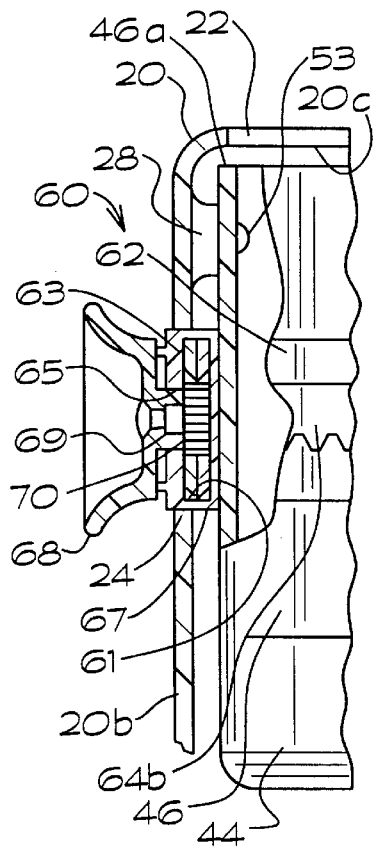
FIG. 4 is an enlarged section view of one element of the container-holding device of FIG. 1 taken along section line 4—4 of FIG. 1.

With combined reference to FIGS. 3 and 4, the adjuster assembly 60 is shown in greater detail and includes an adjuster 66 and an adjuster band 62. The adjuster 66 includes an adjuster housing 67 having walls defining a slot 61 therethrough and including a first wall 63 having a shaft-receiving hole 65 provided therethrough, a knob 68 rotatably disposed on an exterior surface of the first wall 63, a toothed gear 70 rotatably disposed within the adjuster housing 67 and attached coaxially to the knob 68 at opposed distal ends of an inwardly-projecting shaft 69 provided through the shaft-receiving hole 65. Additionally, the knob 68 may be provided with ratcheting means (not shown) for incrementally advancing the knob 68 in either a first or a second rotational direction.

The adjuster band 62 includes a first end 62a, a first end toothed opening 64a disposed towards the first end 62a, a second end 62b opposite the first end 62a and a second end toothed opening 64b disposed towards the second end 62b. The first end 62a, the second end 62b and portions of the adjuster band 62 disposed respectively inwardly therefrom are inserted into opposed open ends of the adjuster housing slot 61 and slidingly held therein. The cooperation of the adjuster band ends 62a and 62b and the adjuster 66 thereby defines an adjustable diameter loop 62c (shown, for example, generally in FIG. 7), within which the adjustable diameter sleeve portion 46 is inserted and retained.

The first and second toothed openings 64a and 64b are provided with opposing gear teeth 72 and 74 such that rotation of the toothed gear 70 in a first direction thereof causes the adjuster band first and second ends 62a and 62b to move in opposite outwardly directions within and relative to the adjuster housing slot 61, thereby constricting the adjustable diameter loop 62c. Rotation of the toothed gear 70 in a second direction opposite the first direction results in the adjuster band first and second ends 62a and 62b moving in opposite inwardly directions within and relative to the adjuster housing slot 61, thereby dilating the adjustable diameter loop 62c.

The adjustable diameter sleeve portion first and second longitudinal ends 47 and 48 are permitted to overlap, thereby providing a diameter "D" of the adjustable diameter sleeve portion 46 which can be constricted or dilated by causing more or less overlap between the adjustable diameter sleeve portion first and second longitudinal ends 47 and 48. The diameter "D" of the adjustable diameter sleeve portion 46 is adjusted by constricting or dilating the size of the adjustable diameter loop 62c, which abuts an outer surface 46s of the adjustable diameter sleeve portion 46.

The outwardly-projecting flaps 54 provide a relatively uniform bridge surface 55 (FIG. 1) between the support top wall 20a at an inner edge 22a of the cup opening 22 and the adjustable diameter sleeve portion open upper end 46a. The bridge surface 55 provides a visually-pleasing appearance and prevents objects from falling between the adjustable diameter sleeve portion 46 and the cup opening inner edge 22a.

In use, a container-holding device according to a preferred embodiment of the present invention is used in an automobile, boat or other vehicle. A user of the container-holding device 10 rotates the knob 68 in the second direction, thereby rotating the toothed gear 70 in the second direction and moving the adjustable band first and second ends 62a and 62b in opposite intwardly directions within and relative to the adjuster housing slot 61. The user continues to rotate the knob 68 in the second direction until the adjustable diameter sleeve portion diameter "D" is dilated sufficiently enough to receive the cup 2. The cup 2 is then inserted into the cup opening 22 and received by the adjustable diameter sleeve portion 46 so that the fixed diameter cup base portion 44 is permitted to support the cup 2 from an underside thereof.

If the adjustable diameter sleeve portion diameter "D" is too large for the cup 2, the user rotates the knob 68 in the first direction, thereby rotating the toothed gear 70 in the first direction and moving the adjustable band first and second ends 62a and 62b in opposite outwardly directions within and relative to the adjuster housing slot 61. The user continues to rotate the knob 68 in the first direction until the adjustable diameter sleeve portion 46 abuts an outer surface of the cup 2, closely conforming thereto.

With the adjustable diameter sleeve portion diameter "D" set to the proper size to securely receive the cup 2, the cup 2 may then be removed and inserted securely into the cup opening 22 without further adjustments. The user may thereafter use the container-holding device 10 to hold additional cups (not shown) having different and varying shapes, sizes and diameters, using these adjustment techniques.

Figure 5:
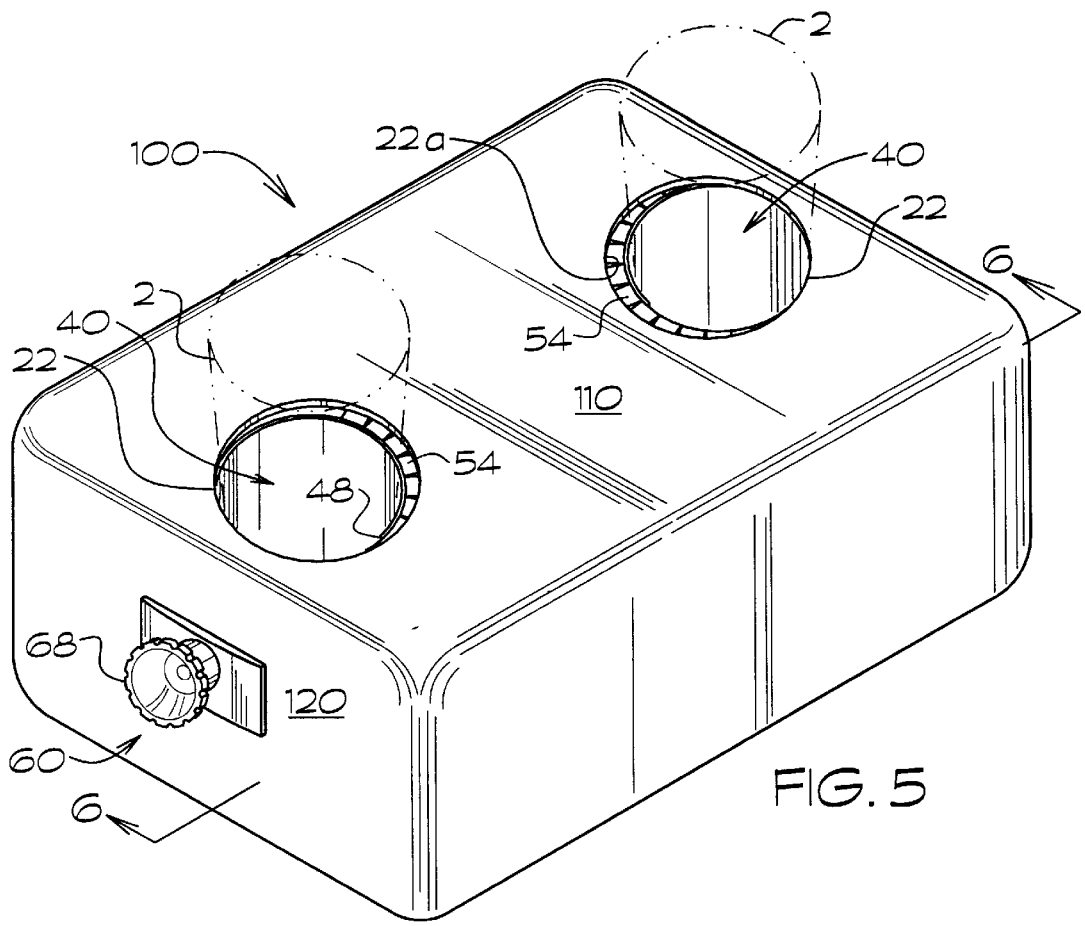
FIG. 5 is a perspective view of an alternative embodiment of a container-holding device of the present invention.
Figure 6:
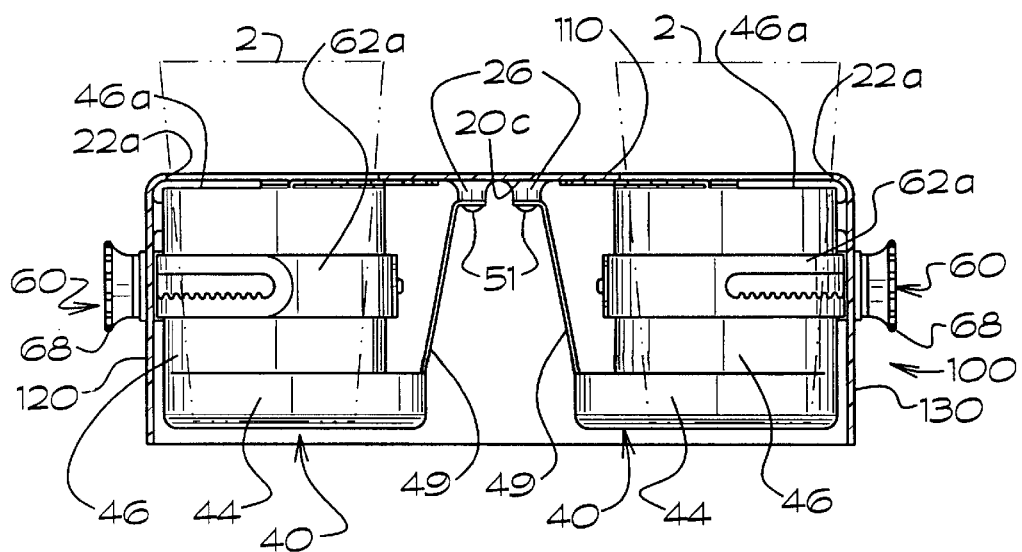
FIG. 6 is a side section view of the container-holding device of FIG. 5, taken along section line 6—6 of FIG. 5; and, FIG. 7 is a perspective view of another alternative embodiment of a container-holding device of the present invention showing the container-holding device in combination with an automobile console, shown in phantom.

With combined reference to FIGS. 5 and 6, a first alternative embodiment of the present invention is shown having a double console support 100, a pair of drink-holder assemblies 40 and a pair of adjuster assemblies 60. The double console support 100 includes a top wall 110 and a plurality of side walls including a first side wall 120 and a second side wall 130 opposite the first side wall 120. The top wall 110 is provided with a pair of cup openings 22 for respectively receiving a pair of cups 2. The first sidewall 120 and the second side wall 130 are respectively provided with an adjuster opening 24 (not shown) for respectively receiving an adjuster assembly 60. The double console support 100 may be made from any suitable light-weight, durable and low-cost material, such as, for example, molded polypropylene. The drink-holder assemblies 40 and the adjuster assemblies 60 are respectively constructed according to the above disclosure of the preferred embodiment of the present invention.

Figure 7:
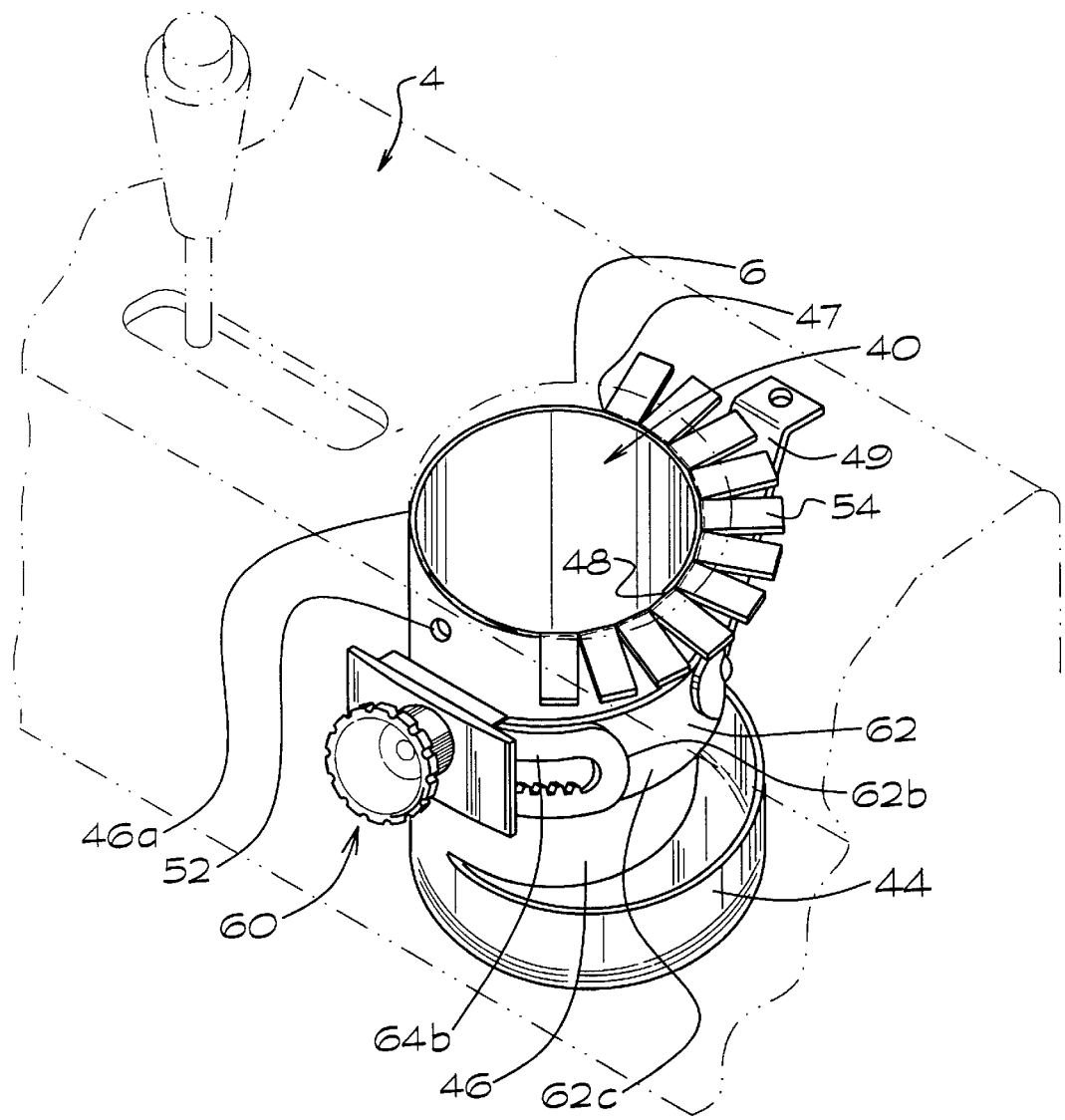

With reference to FIG. 7, a second alternative embodiment of the present invention is shown to be used in combination with an existing auto console 4 having a cup opening 6 provided therethrough. The drink-holder assembly 40 and the adjuster assembly 60 are constructed according to the above disclosure of the preferred embodiment of the present invention.

The foregoing detailed description is given primarily for clearness and understanding and no unnecessary limitations are to be understood therefrom for modifications will become obvious to those skilled in the art upon reading this disclosure and may be made without departing from the spirit of the present invention.

I claim:

1. A container-holding device for use in combination with an automobile console wherein said automobile console is provided with a top wall having a cup opening and a side wall having an adjuster opening, and wherein said container-holding device comprises:

an adjustable drink-holder assembly for depending from a lower surface of said automobile console top wall near said cup opening; and, means for adjusting a circumference of said adjustable drink-holder assembly, said means for adjusting said circumference of said adjustable drink-holder assembly comprising an adjuster assembly attachable to an exterior surface of said automobile console side wall near said adjuster opening, said adjuster assembly extendable inwardly through said adjuster opening said capable of retaining said adjustable drink-holder assembly, said adjuster assembly comprising, an adjuster including
   (a) an adjuster housing having walls defining a slot therethrough, said adjuster housing walls including an outer wall having a shaft-receiving hole provided therethrough,
   (b) a knob disposed on an exterior surface of said adjuster housing outer wall near said shaft-receiving hole,
   (c) a inwardly-projecting shaft having first and second distal ends, said first distal end being attached to said knob, and
   (d) a toothed gear attached to said second distal end of said shaft, said toothed gear being disposed coaxially with said knob and being rotatable within said adjuster housing; and, an adjuster band having a first end, a first end toothed opening disposed towards said first end of said adjuster band, a second end opposite said first end of said adjuster band and a second end toothed opening disposed towards said second end of said adjuster band, said first end toothed opening and said second end toothed opening being slidingly engageable with said toothed gear.

2. The container-holding device according to claim 1, wherein said adjustable drink-holder assembly comprises:

a sleeve assembly disposable near said cup opening of said top wall; and, a base support member having first and second distal ends, said first distal end being attached to said sleeve assembly towards a lower end thereof, said second distal end being attachable to said lower surface of said top wall near said cup opening.

3. The container-holding device according to claim 2, wherein said sleeve assembly comprises:

a generally cylindrical sleeve assembly having an adjustable circumferential cup wall portion and a fixed circumferential cup base portion;

said adjustable circumferential cup wall portion having an open upper end disposable near said top wall cup opening, a first longitudinal end, a second longitudinal end and a plurality of flaps extending outwardly from said open upper end; and, said fixed circumferential cup base portion having a closed lower end opposing said open upper end of said adjustable circumferential cup wall portion.

4. A container-holding device, comprising:

a support having a top wall and a plurality of side walls depending from a lower surface of said top wall, said top wall having a cup opening provided therethrough, said plurality of side walls including a first side wall, said first side wall being provided with an adjuster opening therethrough, an adjustable drink-holder assembly depending from said lower surface of said top wall near said cup opening, and means for adjusting a circumference of said adjustable drink-holder assembly;

said adjustable drink-holder assembly comprising a sleeve assembly disposed near said cup opening of said top wall, and a base support member having first and second distal ends, said first distal end being attached to said sleeve assembly towards a lower end thereof, said second distal end being attached to said lower surface of said top wall near said cup opening;

said sleeve assembly comprising
   a generally cylindrical sleeve assembly having an adjustable circumferential cup wall portion and a fixed circumferential cup base portion;
   said adjustable circumferential cup wall portion having an open upper end disposed near said top wall cup opening, a first longitudinal end, a second longitudinal end and a plurality of flaps extending outwardly from said open upper end; and,
   said fixed circumferential cup base portion having a closed lower end opposing said open upper end of said adjustable circumferential cup wall portion.

5. The container-holding device according to claim 4, wherein said means for adjusting said circumference of said adjustable drink-holder assembly comprises:

an adjuster assembly attached to an exterior surface of said first side wall near said adjuster opening, said adjuster assembly extending inwardly through said adjuster opening and retaining said adjustable drink-holder assembly.

6. The container-holding device according to claim 5, wherein said adjuster assembly comprises:

an adjuster including
   (a) an adjuster housing having walls defining a slot therethrough, said adjuster housing walls including an outer wall having a shaft-receiving hole provided therethrough,
   (b) a knob disposed on an exterior surface of said adjuster housing outer wall near said shaft-receiving hole,
   (c) a inwardly-projecting shaft having first and second distal ends, said first distal end being attached to said knob, and
   (d) a toothed gear attached to said second distal end of said shaft, said toothed gear being disposed coaxially with said knob and being rotatable within said adjuster housing; and, an adjuster band having a first end, a first end toothed opening disposed towards said first end of said adjuster band, a second end opposite said first end of said adjuster band and a second end toothed opening disposed towards said second end of said adjuster band, said first end toothed opening and said second end toothed opening being slidingly engageable with said toothed gear.

7. A container-holding device, comprising:

a support having a top wall and a plurality of side walls depending from a lower surface of said top wall, said top wall having first and second cup openings provided therethrough, said plurality of side walls including a first side wall and a second side wall, said first side wall being provided with a first adjuster opening therethrough, said second side wall being provided with a second adjuster opening therethrough, a first adjustable drink-holder assembly depending from said lower surface of said top wall near said first cup opening, a second adjustable drink-holder assembly depending from said lower surface of said top wall near said second cup opening, means for adjusting a circumference of said first adjustable drink-holder assembly, and means for adjusting a circumference of said second adjustable drink-holder assembly;

said first adjustable drink-holder assembly comprising a first sleeve assembly disposed near said first cup opening of said top wall, and a first base support member having first and second distal ends, said first distal end being attached to said first sleeve assembly towards a lower end thereof, said second distal end beings attached to said lower surface of said top wall near said first cup opening;

said first sleeve assembly comprising a first generally cylindrical sleeve assembly having a first adjustable circumferential cup wall portion and a first fixed circumferential cup base portion;

said first adjustable circumferential cup wall portion having an open upper end disposed near said top wall first cup opening, a first longitudinal end, a second longitudinal end and a plurality of flaps extending outwardly from said open upper end; and, said first fixed circumferential cup base portion having a closed lower end opposing said open upper end of said first adjustable circumferential cup wall portion.

8. The container-holding device according to claim 7, wherein said second adjustable drink-holder assembly comprises:

a second sleeve assembly disposed near said second cup opening of said top wall; and, a second base support member having first and second distal ends, said first distal end being attached to said second sleeve assembly towards a lower end thereof, said second distal end being attached to said lower surface of said top wall near said second cup opening.

9. The container-holding device according to claim 8, wherein said second sleeve assembly comprises:

a second generally cylindrical sleeve assembly having a second adjustable circumferential cup wall portion and a second fixed circumferential cup base portion;

said second adjustable circumferential cup wall portion having an open upper end disposed near said top wall second cup opening, a first longitudinal end, a second longitudinal end and a plurality of flaps extending outwardly from said open upper end; and, said second fixed circumferential cup base portion having a closed lower end opposing said open upper end of said second adjustable circumferential cup wall portion.

10. The container-holding device according to claim 7, wherein said means for adjusting said circumference of said first adjustable drink-holder assembly comprises:

a first adjuster assembly attached to an exterior surface of said first side wall near said first adjuster opening, said first adjuster assembly extending inwardly through said first adjuster opening arid retaining said first adjustable drink-holder assembly.

11. The container-holding device according to claim 10, wherein said first adjuster assembly comprises:

a first adjuster including (a) a first adjuster housing having walls defining a slot therethrough, said first adjuster housing walls including an outer wall having a shaft-receiving hole provided therethrough, (b) a first adjuster knob disposed on an exterior surface of said first adjuster housing outer wall near said shaft-receiving hole, (c) a first inwardly-projecting shaft having first and second distal ends, said first distal end being attached to said first adjuster knob, and (d) a first adjuster toothed gear attached to said second distal end of said first inwardly-projecting shaft, said first adjuster toothed gear being disposed coaxially with said first adjuster knob and being rotatable within said first adjuster housing; and, a first adjuster band having a first end, a first end toothed opening disposed towards said first end of said first adjuster band, a second end opposite said first end of said first adjuster band and a second end toothed opening disposed towards said second end of said first adjuster band, said first end toothed opening and said second end toothed opening being slidingly engageable with said toothed gear.

12. The container-holding device according to claim 7, wherein said means for adjusting said circumference of said second adjustable drink-holder assembly comprises:

a second adjuster assembly attached to an exterior surface of said second side wall near said second adjuster opening, said second adjuster assembly extending inwardly through said second adjuster opening and retaining said second adjustable drink-bolder assembly.

13. The container-holding device according to claim 12, wherein said second adjuster assembly comprises:

a second adjuster including (a) a second adjuster housing having walls defining a slot therethrough, said second adjuster housing walls including an outer wall having a shaft-receiving hole provided therethrough, (b) a second adjuster knob disposed on an exterior surface of said second adjuster housing outer wall near said shaft-receiving hole, (c) a second inwardly-projecting shaft having first and second distal ends, said first distal end being attached to said second adjuster knob, and (d) a second adjuster toothed gear attached to said second distal end of said second inwardly-projecting shaft, said second adjuster toothed gear being disposed coaxially with said second adjuster knob and being rotatable within said second adjuster housing; and, a second adjuster band having a first end, a first end toothed opening disposed towards said first end of said second adjuster band, a second end opposite said first end of said second adjuster band and a second end toothed opening disposed towards said second end of said second adjuster band, said first end toothed opening and said second end toothed opening being slidingly engageable with said toothed gear.

* * * * *

UNITED STATES PATENT AND TRADEMARK OFFICE
CERTIFICATE OF CORRECTION

PATENT NO. : 5,931,431
DATED : August 3, 1999
INVENTOR(S) : Thomas A. Stinnett

It is certified that error appears in the above-identified patent and that said Letters Patent is hereby corrected as shown below:

Claim 1, col. 5, line 14, change "said" to -- and -- ;

Claim 10, col. 7, line 62, change "arid" to -- and -- ;

Claim 12, col.8, line 33, change "drink-bolder" to -- drink holder -- .

Signed and Sealed this

Twelfth Day of September, 2000

Attest:

Q. TODD DICKINSON

Attesting Officer

Director of Patents and Trademarks